United States Patent [19]

Kondo et al.

[11] Patent Number: 5,280,626
[45] Date of Patent: Jan. 18, 1994

[54] MULTI-PROCESS EMULATOR SUITABLE FOR TESTING SOFTWARE UNDER MULTI-PROCESS ENVIRONMENTS

[75] Inventors: Megumu Kondo, Kawasaki; Satoshi Masuda, Sayama, both of Japan

[73] Assignee: Hitachi, Ltd., Tokyo, Japan

[21] Appl. No.: 701,359

[22] Filed: May 10, 1991

Related U.S. Application Data

[63] Continuation of Ser. No. 277,258, Nov. 29, 1988, abandoned.

Foreign Application Priority Data

Dec. 2, 1987 [JP] Japan ............... 62-303118

[51] Int. Cl.$^5$ .............................................. G06F 9/00
[52] U.S. Cl. ........................... 395/500; 364/267.5; 364/265.6; 364/264.3; 364/281.4; 364/DIG. 1
[58] Field of Search ............. 395/500; 371/16.1, 16.2, 371/25.1

[56] References Cited

U.S. PATENT DOCUMENTS

| | | | |
|---|---|---|---|
| 4,141,078 | 2/1979 | Bridges | 364/900 |
| 4,231,087 | 10/1980 | Hunsberger | 364/200 |
| 4,270,167 | 5/1981 | Koehler | 364/200 |
| 4,303,973 | 12/1981 | Williamson | 364/189 |
| 4,333,144 | 6/1982 | Whiteside | 364/200 |
| 4,363,090 | 12/1982 | Garcia | 364/139 |
| 4,384,324 | 5/1983 | Kim | 364/200 |
| 4,463,442 | 7/1984 | Dachowski | 364/900 |
| 4,484,266 | 11/1984 | Becker | 364/200 |
| 4,517,661 | 5/1985 | Graf | 364/900 |
| 4,525,804 | 6/1985 | Mosier | 364/900 |
| 4,562,529 | 12/1985 | Drummond | 364/140 |
| 4,587,612 | 5/1986 | Fisk | 364/200 |
| 4,590,550 | 5/1986 | Eilert | 364/200 |
| 4,603,385 | 7/1986 | Mueller | 395/500 |
| 4,628,435 | 12/1986 | Tashiro | 364/130 |
| 4,628,445 | 12/1986 | Buonomo | 364/900 |
| 4,635,193 | 1/1987 | Moyer | 395/375 |
| 4,674,089 | 6/1987 | Poret | 364/200 |
| 4,720,779 | 1/1988 | Reynard | 364/200 |
| 4,727,480 | 2/1988 | Albright | 364/200 |
| 4,775,953 | 10/1988 | Goettelmann | 364/900 |
| 4,788,683 | 11/1988 | Hester | 371/20 |
| 4,802,116 | 1/1989 | Ward | 364/900 |

OTHER PUBLICATIONS

"Real time emulation of 68000/68010 up to ZOMHZ at highest is made possible by a high speed RAM as a decoder" NIKKEI Electronics journal, No. 367, Apr. 1985 pp. 293-315.

Primary Examiner—Eric Coleman
Attorney, Agent, or Firm—Fay, Sharpe, Beall, Fagan, Minnich & McKee

[57] ABSTRACT

An emulator for use in a multi-process environment for simulating a computer and supporting testing of software, where the emulator detects a first event corresponding to a desired process on the basis of process information; detects a second event corresponding to a desired address on the basis of address information; stores in a memory the output of the first event and sets the output of the first event in the memory, when the desired process is being operated and resets the content in the memory, when a process, which is not desired, is being operated, such that the emulator can detect a final desired event on the basis of both the process information and the address information.

7 Claims, 6 Drawing Sheets

MULTI-PROCESS EMULATOR SUITABLE FOR TESTING SOFTWARE UNDER MULTI-PROCESS ENVIRONMENTS

This is a continuation of application Ser. No. 277,258, filed Nov. 29, 1988 now abandoned.

BACKGROUND OF THE INVENTION

This invention relates to an emulator for multi-processes, more specifically to a device for supporting the testing of software, and in particular to an emulator for multi-processes and an emulation method, which are suitable for the testing of software under a multi-process environment.

In the case where a system, in which a microprocessor of 32 or 16 bits is incorporated, is tested, an in-circuit emulator (hereinbelow called simply emulator) is used often. The in-circuit emulator is described in an article entitled "Real-time emulation of 68000/68010 up to 20 MHz at highest is made possible by using a high speed RAM as a decoder" (in Japanese) published in a journal NIKKEI Electronics, No. 367, (Apr. 22, 1985), pp. 293-315.

It is possible to carry out a test under real use operating environments by connecting an emulator instead of a CPU in a target system.

An outline of the structure and the summary of operation of an emulator will be explained below, referring to FIG. 1. An emulator consists of a main part of emulator 4 and an emulation pod 1. Even if the CPU in the target system 8, which is to be emulated, is changed, it is not necessary to change the main part of the emulator. The emulation pod 1 is replaced in accordance to the CPU in the target system 8. An emulation CPU 3 executes a job in place of the CPU in the target system 8 and should be identical to the CPU in the target system 8. A timing circuit 2 generates a timing signal matching with the CPU 3. The main part of emulator 4 is composed of a control processor 7 controlling the whole emulator, a trace memory 6 storing signals coming from the emulation pod 1 and an event monitor 5 setting, supervising and detecting events.

Operations of such an emulator are to stop the execution of a program, when it proceeds to a certain address and read-out/rewrite the memory content at that time, to stop the execution, when read-out/rewrite data is in accordance with a particular values, and to execute instructions in a program one after another from a certain address, etc.

Figure 2:
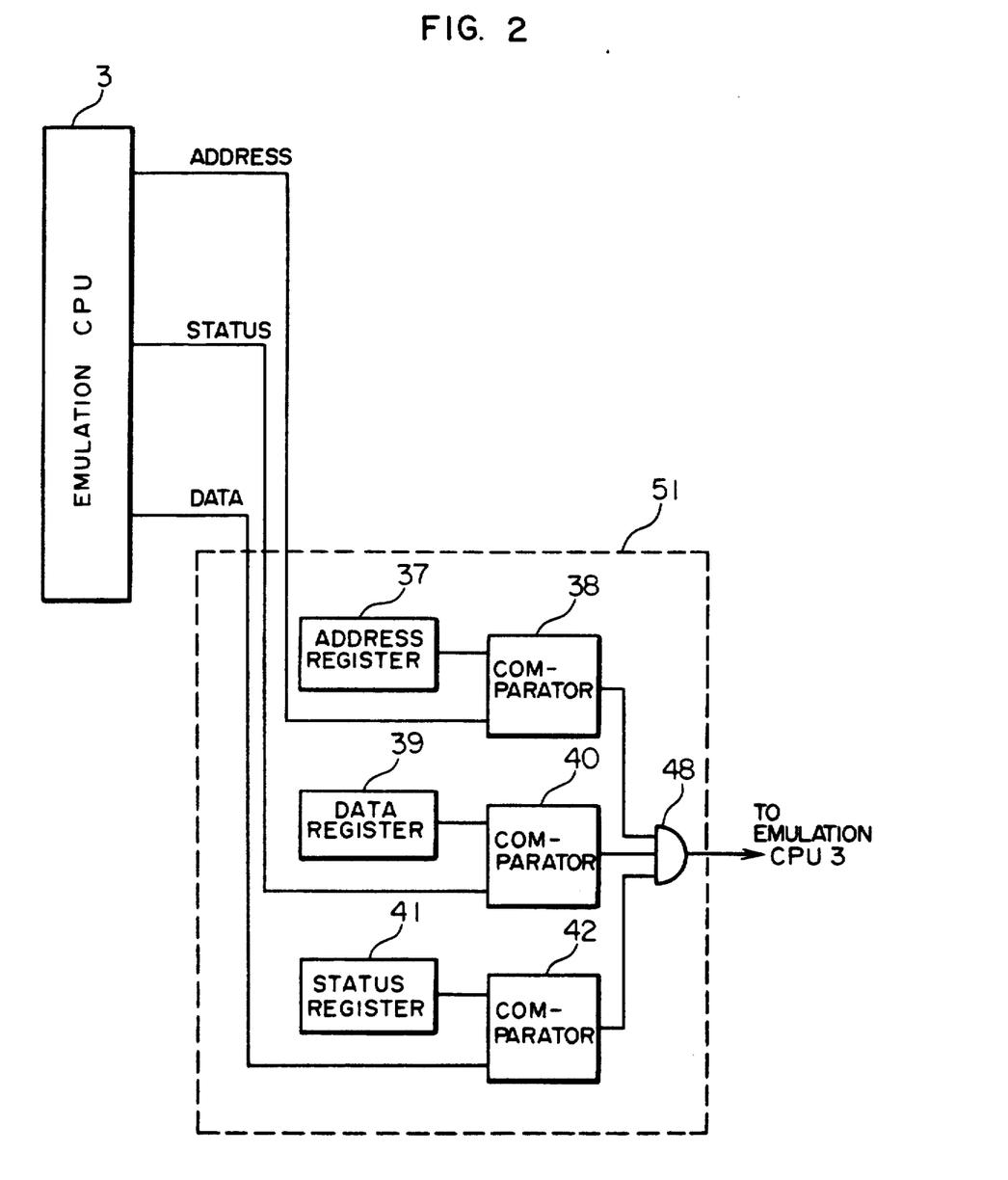
FIG. 2 is a scheme indicating the outline of the construction of a simple event detecting portion.

In an event monitor in an emulator as indicated in FIG. 2, occurrence of an event, which stops the execution of a program, can be defined only by a simple address and in the case where a software in a multi-process is tested, it is independent of which program is in operation.

FIG. 2 indicates an example of the construction of an event monitor effecting generation and supervision of an event in the emulator. Block 51 represents a simple event detector portion.

In the case where it is desired to interrupt the execution of a process (called "break point setting"), the condition for each of registers 37, 39 and 41 is set. A method setting a break point will be described. To define an event which occurs when a certain value is written in a certain address, if it is desired to generate an event, a desired address is set at the address register 37, a desired value is set at the data register 39 and W (Write) is set at the status register 41. Address, data and status information are supplied every moment from the emulation CPU 3 during the execution and they are compared with the values set by three comparators 38, 40 and 42, respectively. These comparators output "1", when they are in accordance with each other. When all of the address, the data and the status are in accordance with the respective values, the output of an AND gate 48 is "1", which indicates the occurrence of an event. Further, the comparators are so constructed that in the case where no conditions are set for the address register 37, the status register 39 or the data register 41, the corresponding comparator outputs "1".

Figure 3:
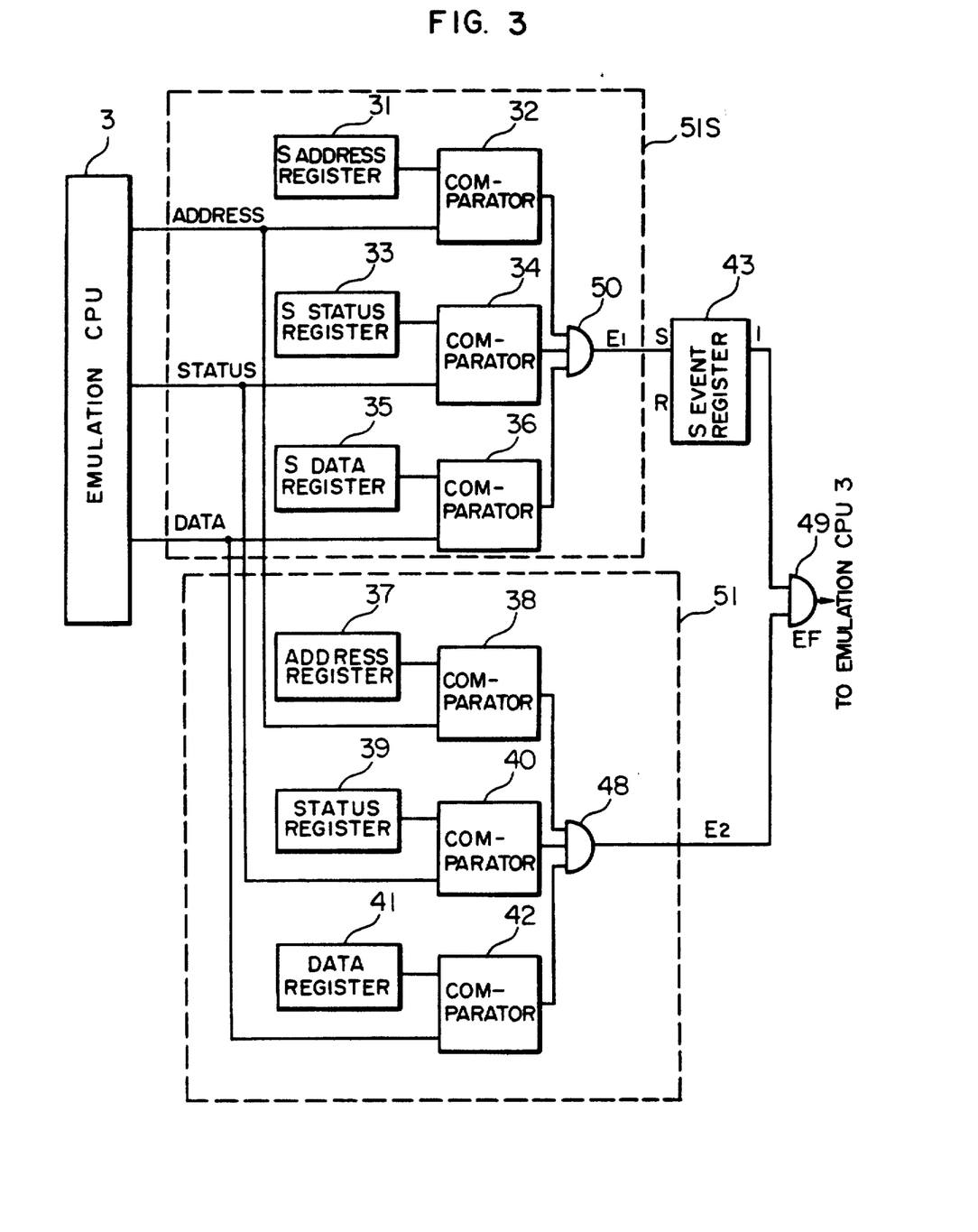
FIG. 3 is a scheme indicating the outline of the construction of an event detecting portion capable of detecting a sequential event in the emulation.

FIG. 3 is another example of the event monitor. According to this method, sequential events can be defined, that is, it is possible to set the device so as to confirm finally an event occurrence $E_F$, only when a second event $E_2$ (called post-event) occurs, after a first event $E_1$ (called pre-event) has occurred. The event $E_1$ is generated by an event detecting portion 51S having a structure similar to the simple event detecting portion 51 indicated in FIG. 2. Similarly to the detecting portion 51 the conditions for the event $E_1$ are set in S registers 31, 33 and 35. The conditions for the event $E_2$ are set in the simple event detecting portion 51. Here the prefix S means "Sequential" When the conditions for the event $E_1$ are fulfilled the output of an AND gate 50 is "1"; the S (Set) input of the S event register 43 is "1"; and the $E_1$ event occurrence is memorized. At this time the output of the S event register 43 is also "1". After that, when the event $E_2$ occurs at the simple event detecting portion 51, the output of the AND gate 48 is "1". The output of the AND gate 49 is also "1", a sequential event occurs. Here the S event register is an R-S (Reset-Set) flipflop, in which the output is "1", when the S input is "1", this state being kept, until the R input is "1" and the state is reset.

Figure 4:
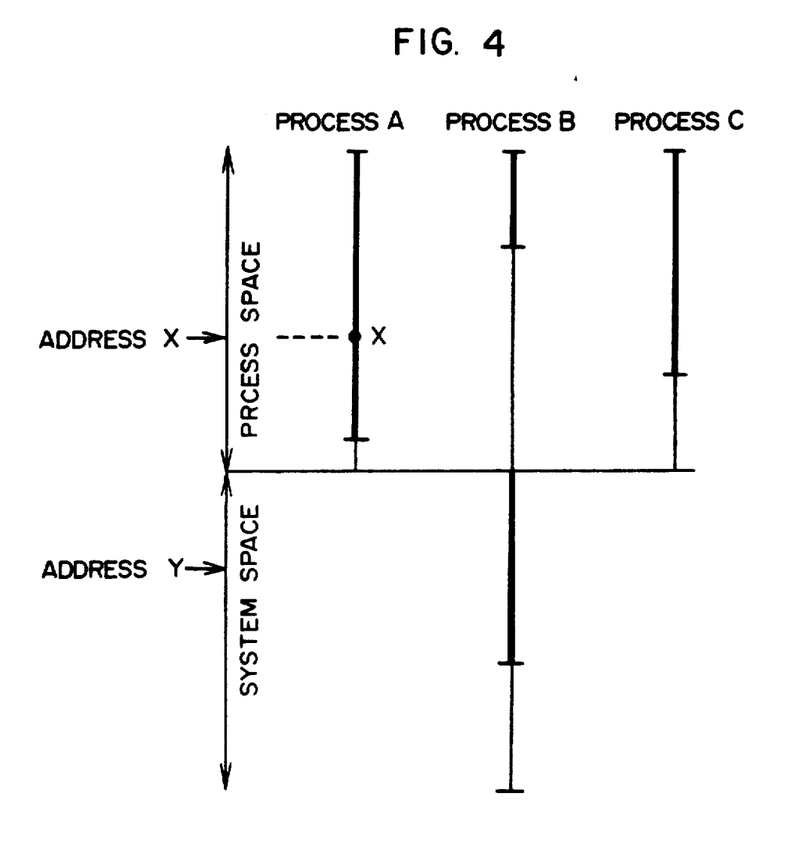
FIG. 4 is a diagram indicating an address space and a system space in a multi-process.

Since, according to the method indicated in FIG. 2, the detection of the event is effected only by a combination of the address, the data and the status in the execution of a single program, if this method were used for a multi-process system as it is, it would give rise to a problem. In a multi-process system a plurality of programs are operated simultaneously (macroscopically). Its address space is indicated in FIG. 4. There are 3 processes A, B and C, each of which has an address space indicated by a thick line. Each of the processes has an independent process space and each of the processes A and C has an address X. The address X of the process A is completely different from the address X of the process C. On the other hand a system space is a space, which is regarded as the same by all the processes and in which a control program (operating system), data shared by different processes, etc. are stored.

It is supposed that, in such a situation, where a plurality of processes are operated, a break point is set at the address X of the process A. According to the method indicated in FIG. 2, since only the address X can be specified, even if the operator is informed of a fact that an event occurs at the address X, the operator cannot know which is operated, the process A or the process C.

According to the method indicated in FIG. 3, since a sequential event can be set, the system can be constructed so as to detect the commencement of a desired process as an event $E_1$ in the event detecting portion 51S and the address, which should be the desired break point, as an event $E_2$ in the event detecting portion 51.

That is, the address, in which the process identification number of the process, which is currently being operated, is set in the S address register 31 (event detecting portion 51S); desired process identification information is set in the S data register 35; and W (Write) is set in the S status register 33. Additionally by setting address conditions, which defines the break point at the simple event detecting portion 51, it is possible to stop a desired address, when a certain process is operated (i.e. desired process identification information is stored in a particular address). However, there is a problem also in this case. That is, supposing that the event concerning the process identification information is $E_1$ and the event concerning the break point address is $E_2$, the desired $E_F$ is confirmed, only when $E_2$ occurs after $E_1$. According to the method indicated in FIG. 3, once $E_1$ occurs, since it is not possible to reset the occurrence of the event $E_1$ as far as an event monitor 5 is not reset, the following problem takes place.

This problem will be explained again, referring to FIG. 5, which is a diagram indicating mutual relations among the plurality of processes in FIG. 4 in a time series. Now it is supposed that it is desired to set a break point in the address X in the process A. The detecting portion 51S detects the occurrence of event $E_1$ at $t_1$, when the process A begins to run. Thereafter, if it is supposed that an execution process is turned over from A to C at $t_2$ (called process switch) and that the address X occurs at a point of time $t_3$, according to the method indicated in FIG. 3 an erroneous desired event $E_F$ occurs improperly at $t_3$.

SUMMARY OF THE INVENTION

An object of this invention is to provide an emulator working efficiently under a multi-process environment, in order to remove the drawbacks of the prior art techniques.

Other objects of this invention will be obvious from the description in the specification and the drawings.

In order to achieve the above object, an emulator according to this invention is constructed by adding means to reset the event detection state described above, when the event occurrence conditions are no longer fulfilled, to the detection and memory means for the pre-event $E_1$ and the detection means for the post-event $E_2$.

When the break point is set in the address X in the process A, in the above example, the process A as the pre-event $E_1$ and the address X as the post-event $E_2$ are set. As soon as the process A begins to be operated, the pre-event $E_1$ occurs and this fact is memorized. When a process switch from the process A to the process C takes place, the memory of the pre-event $E_1$ is reset. For this reason, even if the address X occurs in the process C, no break point occurs erroneously.

DESCRIPTION OF THE PREFERRED EMBODIMENTS

Hereinbelow an embodiment of this invention will be explained. There, exists necessarily an operating system (hereinbelow abbreviated to OS) controlling processes under multi-process environments. In the OS "process identification information" indicating which process is currently operated is stored in a particular address (determined for every system) called the current process address.

Figure 6:
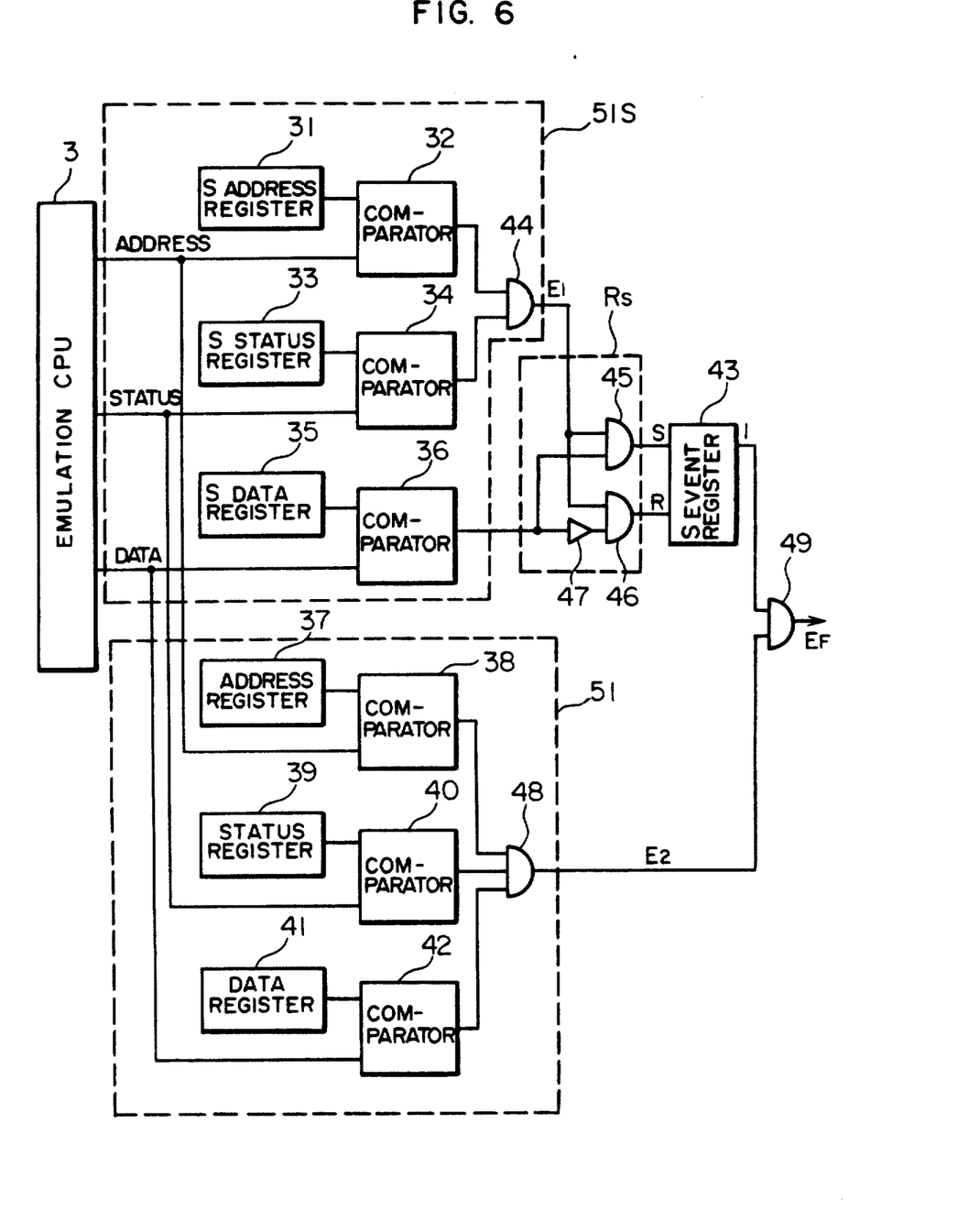
FIG. 6 is a scheme indicating the outline of an emulator for multi-process, which is an embodiment of this invention.

The case where a break point is set in the address X in the process A under the multi-process environment indicated in FIG. 4 will be explained, referring to FIG. 6. The current process address is set in the S address register 31; W (Write) is set in the S status register 33; and process identification information of the process, for which it is desired to set a break point, (information corresponding to A) is set in the S data register 35. Further, an address, for which it is desired to set a break point, is set in the address register 37 and no address is set in the status register 39 in the data register 41. When the execution of the program is started in this state, address, status and data signals are supplied from the emulation CPU 3 and the comparators 32, 34, 36, 38, 40 and 42 compare them for every moment with the predetermined values. As soon as the process A begins to be operated, since the OS writes process identification information corresponding to the process A in the current process address, the outputs of the comparators 32 and 34 become "1" and the output of the AND gate 44 is also "1". Since the output of the comparator 36 is also "1", the output of the AND gate 45 is "1" and the S (Set) input of the S event register 43 is "1" so that the occurrence of the pre-event $E_1$ is memorized. Thereafter, when the address X occurs while the execution of the process A continues, the output of the comparator 38 becomes "1" and the outputs of the comparators 40 and 42 are also "1" (because the status register 39 and the data register 41 are not set), the output of the AND gate 48 is "1" and the output of the AND gate 49 is also "1" so that the event $E_F$ occurs.

Figure 5:
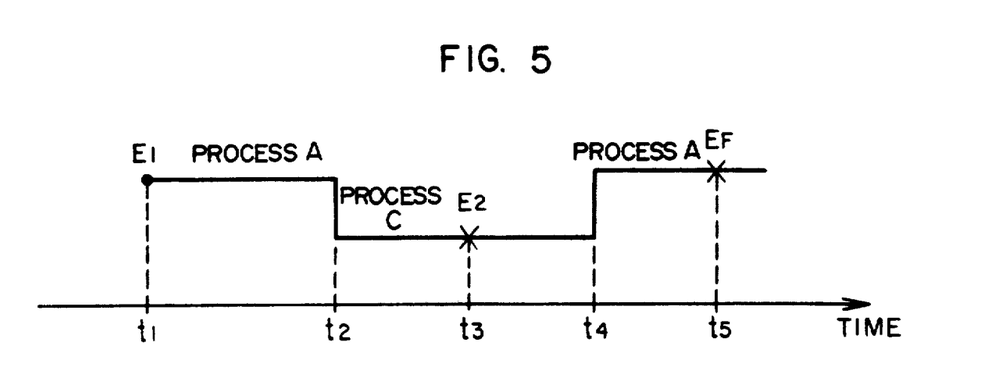
FIG. 5 is a diagram indicating variations of each of the processes in the multi-process in a time series.

If it is supposed that a process switch takes place and the process is changed at $t_2$ in FIG. 5 from A to C during the state where the pre-event $E_1$ has occurred and the output of the S event register 43 is "1", since the address supplied by the emulation CPU 3 is equal to the current process address and the status is W (Write), both the outputs of the comparators 32 and 34 are "1" and the output of the AND gate 44 is also "1". Further, since the data (process identification information) supplied by the emulation CPU 3 at this point of time corresponds to the process C and differs from the content (data A) of the S data register 35, the content of the S event register 43 is reset by resetting means $R_S$. That is, the input of the AND gate 46, which has passed through an inverter 47, is "1" and the output thereof is also "1". Further the R (Reset) input of the S event register 43 is "1" so that the occurrence of the pre-event is reset. Consequently, even if the address X (address X in the process C) occurs and the output of the AND gate 48 is "1", the output of the gate 49 is not "1" and no erroneous event occurs.

Although, in the above explanation, the process identification information is set directly in the S data register 35, in the situation where the emulator is used, in many cases the process identification information set in the S data register is generated within the OS and it is difficult for the operator of the emulator to know it. Several methods for specifying the process in such a situation are conceivable.

Figure 1:
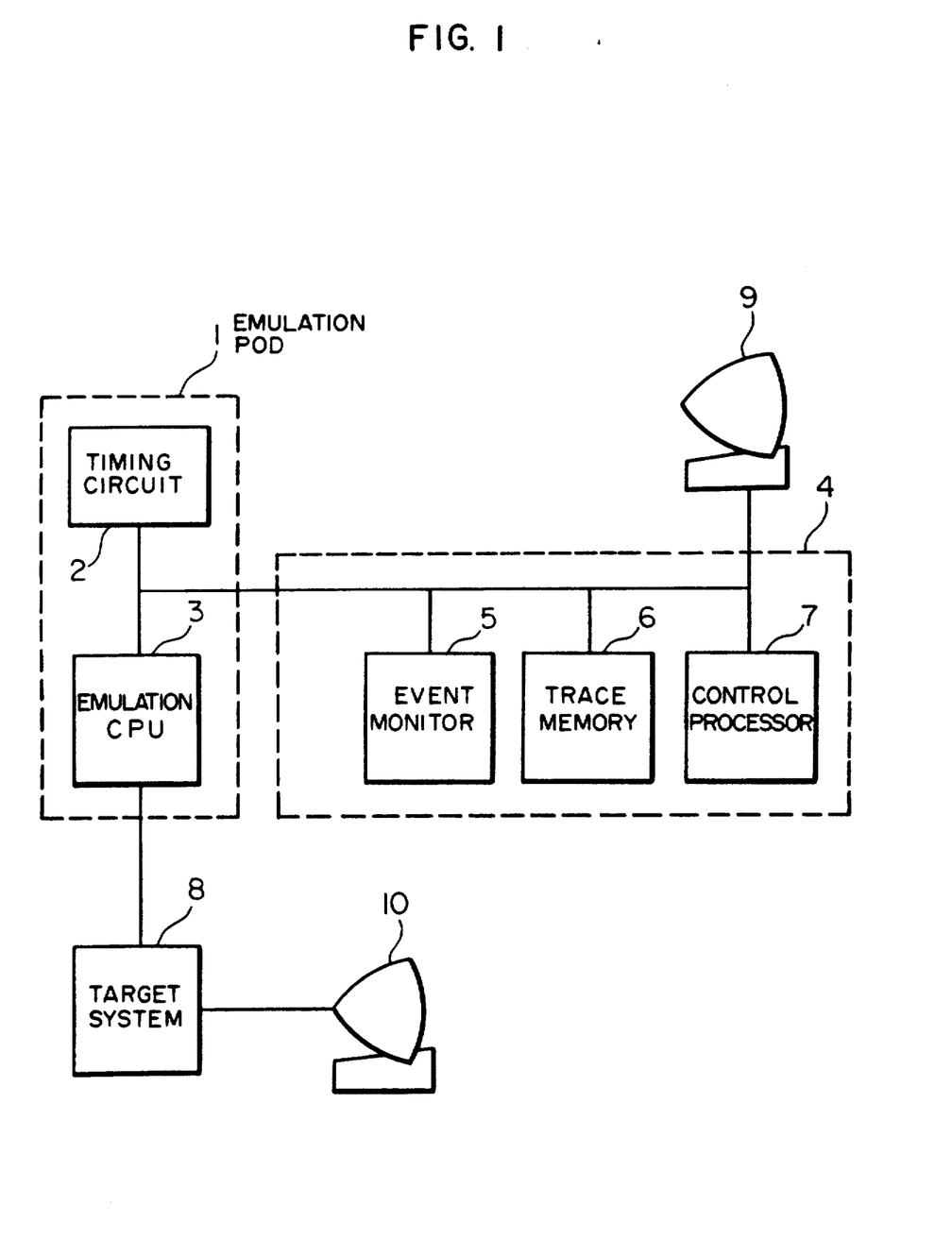
FIG. 1 is a scheme indicating the outline of the construction of a whole in-circuit emulator.

According to a first method, when the OS generates a new process, the correspondence between a symbolic process identification name (e.g. "bin/word processor" which the user of the emulator can recognize) and identification information (e.g. 10 which the OS gives) is outputted to a target display 10 (FIG. 1). The user refers thereto and inputs break point information consisting of process identification information, addresses, etc. through a keyboard attached to an emulator display 9. Inputted identification information is set in the S data register 35. In this state the emulator begins to be operated. When an event $E_F$ is generated according to the procedure explained previously, the execution in the emulator pod 1 is stopped and the control is transferred to the control processor 7, after having stopped also write-in in the trace memory 6. It is possible to know the history of execution and the current state of the program by examining thereafter the content of the trace memory 6 and the memory content of the program and to carry out the test with a high efficiency.

Figure 7:
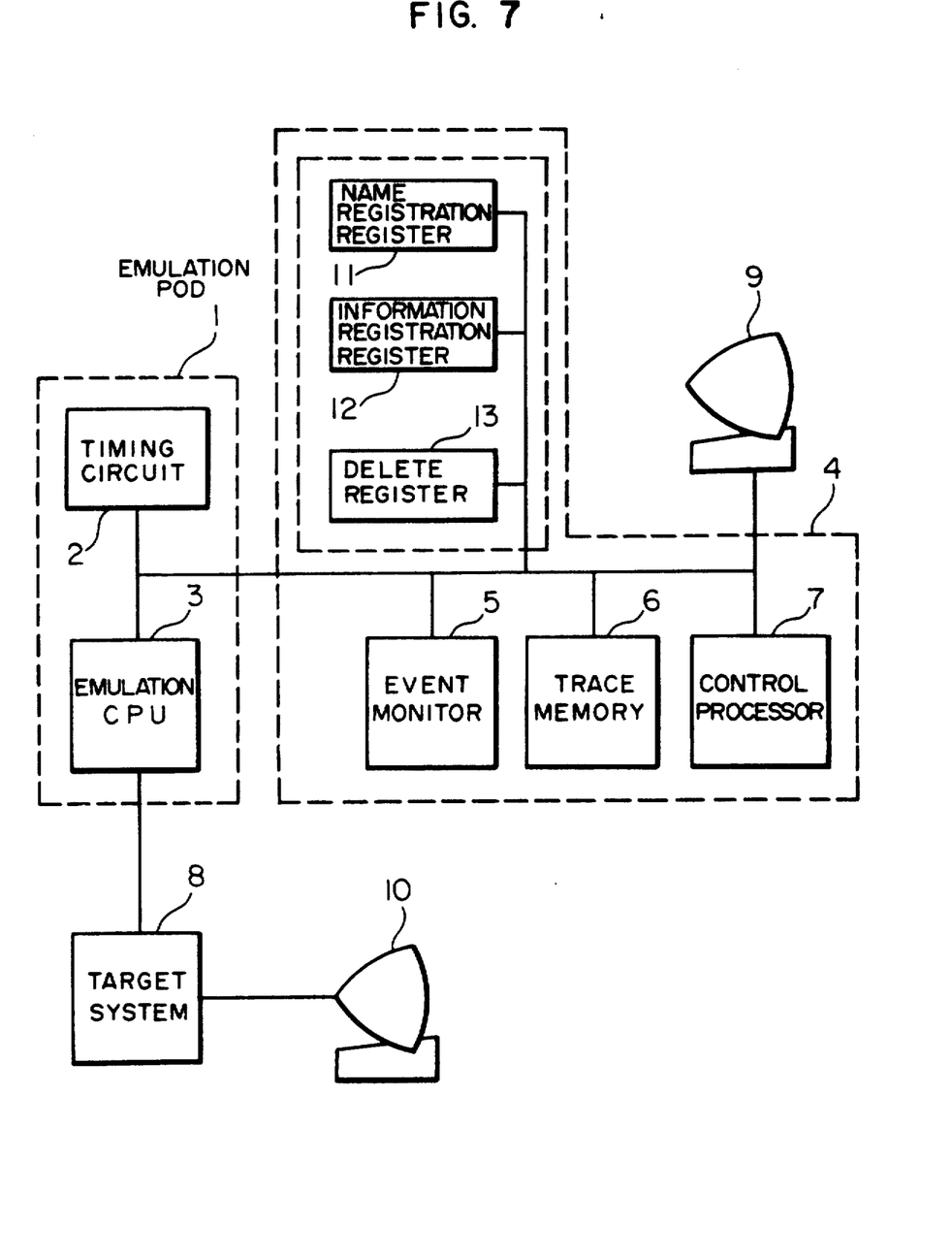
FIG. 7 shows another embodiment of this invention.

A second method for specifying the process is a method, which uses a register group R 11-13 indicated in FIG. 7. That is a method, by which, when the OS generates a new process, the emulator is informed of the process identification name and the identification information by writing a name registration register 11 and an information registration register 12 therein. The writing in the information registration register 12, interrupts the control processor 7. The control processor reads-out the identification name and the identification information from the registers 11 and 12, which are stored in a memory not shown in the figure. In the case where the process disappears, the writing of identification to a delete register 13, it is interrupted in the control processor 7 so that the control processor deletes the identification name and the identification information. In this way the emulator can know by using the display 9 what kind of process is being currently operated and what is the identification name and the identification information of the process.

It is possible for the user to know at any time the correspondence between the identification name and the identification information, which are being currently operated at the emulator, on the emulator display 9 by inputting them through the keyboard attached to the emulator display 9. The user operation and procedures after discovering the process identification information are identical to those described in the preceding embodiment. Further, when the break point is set, although an example has been described, by which it is specified by combining the current process address 31, the process identification information 35 and the break point address 37, it is possible also that the current process address is inputted in advance and when the break point is set, the specification is effected by combining the process identification name and the break point address. Although, in the explanation of the second method for specifying the process described above, the emulator itself memorizes the correspondence between the symbolic identification name and the identification information, it is possible also that the correspondence is controlled by another external processor itself being connected with the exterior and the emulator, while the emulator itself deals with only the identification information. In this manner usability is improved.

The function stated above that the process can be specified by the symbolic name is an additional function for reducing the operation of the user.

Although, in the embodiments described above, a case where the break point is set by a combination condition of the process identification information and the address has been described, it is possible to apply this invention also to the case where it is desired to generate the break point in the case where a certain address occurs, when the content of a certain address (not restricted to the process identification information) has a particular value.

Furthermore, although, in the above explanation, an example, in which an event is generated by ANDing all the conditions, has been described, it is a matter of course that this invention can be applied also to the case of ORing or their combination.

According to this embodiment it is possible to debug the OS and the application under the same environments without developing a software debugger, etc.

According to this invention, since it is possible to set the break point by combining the process identification information and the address, it is possible to utilize the emulator with a high efficiency under multi-process environments. Heretofore, it was thought that an emulator could be used for a single process system and for testing and debugging of the OS, but the emulator was useless for testing and debugging of the application program (program other than the OS developed by user) under multi-process environments, because there was a problem that an erroneous break point was generated, although the address was the same, but another process was running.

It was also thought that other means, e.g. a software debugger, etc. were necessary for testing and debugging.

We claim:

1. An emulator for use in a multi-process environment comprising:

a target system including a plurality of individual processes stored in a common memory and a CPU for executing the individual processes in parallel;

an emulation pod connected to said target system said emulation pod having an emulation CPU identical to the CPU of said target system, wherein during an emulation process the emulation CPU executes selective ones of the individual processes otherwise controlled by the CPU of the target system; and a main part of the emulator connected to said emulation pod having an event monitor including, indicating means for indicating whether a first process of a plurality of processes stored in a common system memory is continuing to operate, wherein each of the processes have an independent process space within the common system memory which lists addresses of each process and, at least the first process and a second process of the plurality have an overlapping address, detecting means for detecting a predetermined condition corresponding to the overlapping address, and outputting means connected to said indicating means and said detecting means for outputting information which shows occurrence of said predetermined condition during operation of said first process and ignores outputting the information during operation of said second process.

2. An emulator for emulation of a target system in a multi-process environment wherein the multi-process environment includes a plurality of individual processes stored in a common system memory and a CPU for executing the individual processes in parallel, each of the individual processes having their own independent process space within the common system memory which lists addresses of each process, at least a first and a second process of the plurality of processes having at least one overlapping address, the emulator comprising:

an emulation pod connected to the target system said emulator pod having an emulation CPU identical to the CPU of said target system, wherein during an emulation process the emulation CPU executes selective ones of the individual processes otherwise controlled by the CPU of the target system; and a main part of the emulator connected to said emulator pod, said main part having an event monitor, said event monitor including, a process detecting circuit means for detecting operation of a first and a second process in the multi-process environment and generating first and second signals representative thereof, a set/reset circuit means connected to receive said first and said second signals of said process detecting circuit for i, setting a set circuit to produce an output signal indicating the operation of the first process, ii, resetting the set circuit to inhibit the output signal upon a start of a second process, and iii, setting of the set circuit to output the output signal upon a subsequent detection of said first process, an event detecting circuit means for detecting a predetermined event corresponding to a desired address of said target system, wherein said desired address exists in at least both the first process and the second process, and outputting means connected to said set/reset circuit means and said event detecting circuit means for outputting information indicating the occurrence of said predetermined event during the operation of said first process, wherein detection of the predetermined event is ignored when the set/reset circuit is reset.

3. The emulator according to claim 2, said event monitor further comprising; an address register, a status register, a data register and a plurality of comparators, said comparators comparing the content set in the address, status and data registers with corresponding content thereto inputted from the emulation CPU.

4. An emulator for testing a target system, wherein there are provided a common system memory for storing a plurality of individual processes and a CPU for executing the individual process in parallel, each of the individual processes having their own independent process space and at least two processes out of the individual processes having one overlapping address, said emulator comprising:

an emulation pod connected to the target system and having an emulation CPU identical to the CPU of said target system, wherein said emulation CPU executes the individual processes instead of the CPU of said target system; and a main part connected to said emulator pod and having an event monitor, said main part including:

an event register in which an information representing the execution of one predetermined process out of individual processes in said emulation pod is set, a first detecting means for detecting the execution of said one predetermined process in said emulation pod to set said event register, and detecting the execution of the process except said one predetermined process to reset said event register, a second detecting means for detecting the execution of a predetermined event with respect to a desired address in said emulation pod, and an outputting means for outputting the signal representing the generation of said predetermined event on the basis of the information set in said register and the detection results of said second detecting means.

5. The emulator according to claim 4, wherein said first detecting means comprises:

a first register means for holding an identifier for identifying said one predetermined process;

a second register means for holding the address on said common system memory to be stored with said identifier;

a third register means for holding the information representing the writing of the information to said common system memory; and a plurality of comparator means for respectively comparing the information respectively held in said first, second and third register means with the corresponding information obtained from said emulation pod respectively.

6. The emulator according to claim 5, wherein said first detecting means sets said event register when the respective information held in said first, second and third register means is coincident with the respectively corresponding information obtained from said emulation pod, and reset said event register when only the respectively information held in said second and third register means is coincident with the respectively corresponding information obtained from said emulation pod.

7. The emulator according to claim 4, wherein said second detecting means comprises a plurality of comparator means for respectively comparing the information respectively held in an address register, a status register and a data register with the corresponding information obtained from said emulator pod respectively, and the signal for representing the execution of said predetermined event is outputting when the coincident is detected on all of said plural comparator means.

* * * * *

UNITED STATES PATENT AND TRADEMARK OFFICE
CERTIFICATE OF CORRECTION

PATENT NO.   :   5,280,626
DATED        :   January 18, 1994
INVENTOR(S)  :   Megumu Kondo, et al.

It is certified that error appears in the above-indentified patent and that said Letters Patent is hereby corrected as shown below:

Claim 4, column 8, line 9, delete "main part" and substitute therefor --event monitor--.

Claim 6, column 8, line 47, delete "respectively" and substitute therefor --respective--.

Claim 7, column 8, line 58, delete "outputting" and substitute therefor --outputted--.

Claim 7, column 8, lines 58-59, delete "coincident" and substitute therefor --coincidence--.

Signed and Sealed this

Twenty-fourth Day of May, 1994

*Attest:*

BRUCE LEHMAN

*Attesting Officer*　　　Commissioner of Patents and Trademarks